United States Patent [19]

Mulhern

[11] Patent Number: 5,718,322

[45] Date of Patent: Feb. 17, 1998

[54] CONVEYOR SAFETY TRAY

[75] Inventor: Francis M. Mulhern, Riverton, N.J.

[73] Assignee: The United States of America as represented by the Secretary of the Navy, Washington, D.C.

[21] Appl. No.: 624,831

[22] Filed: Mar. 21, 1996

[51] Int. Cl.⁶ .................................................. B65G 17/06
[52] U.S. Cl. ........................................ 198/464.4; 198/794
[58] Field of Search .......................... 198/464.4, 794; 414/923, 924

[56] References Cited

U.S. PATENT DOCUMENTS 2,563,514  8/1951  Brosamer .
3,369,648  2/1968  Wentz ..................................... 198/794
3,861,535  1/1975  Huxley, III et al. ................ 414/923 X
4,718,536  1/1988  Toby ................................ 198/464.4 X
5,137,140  8/1992  Lecrone ................................. 198/732

*Primary Examiner*—Janice L. Krizek
*Attorney, Agent, or Firm*—John Forrest; Jacob Shuster

[57] ABSTRACT

The forks of a conveyor tray are hingedly mounted between two end forks rigidly interconnected by a cross-bar and through which electrically powered drive chains impart movement to the tray along a vertical conveyor path. The hingedly mounted tray forks are releasably held in normal load-supporting positions on the cross-bar in alignment with the two end forks, so that they may be pivotally displaced upwardly from such positions by travel resistance forces in excess of a safety level.

9 Claims, 6 Drawing Sheets

CONVEYOR SAFETY TRAY

This invention relates in general to vertical package conveyors, and more particularly to the construction of downwardly traveling package trays associated with such conveyors.

BACKGROUND OF THE INVENTION

Conveyors or elevators used to move loads between vertically spaced decks or platforms by means of motor driven drive chains, are generally known in the art as disclosed for example in U.S. Pat. No. 2,563,514 to Brosamer. Vertical package conveyors having flat carrier trays are also well known and in common use. Such carrier trays are formed by a plurality of forks or fingers that are rigidly interconnected to support packages during travel along a vertical conveyor path. If such a conventional carrier tray structure encounters an obstruction during downward travel, the full motive force of the conveyor power source is exerted thereon through the forks or fingers of the tray. Structural damage often results therefrom as well as injury to personnel.

It is therefore an important object of the present invention to provide a constructural arrangement which will avoid the foregoing referred to damage and injury associated with vertical carriage tray conveyors.

SUMMARY OF THE INVENTION

In accordance with the present invention, all of the forks or fingers of a conveyor carriage tray, except for the two end forks, are hingedly mounted on the cross-bar rigidly interconnecting the two end forks in spaced relation to each other. The hingedly mounted intermediate forks are releasably held in normal load-supporting positions on the cross-bar of the tray aligned with the end forks for conveyance of packages between vertically spaced decks of the conveyor. In response to obstructions encountered by the tray during downward travel, causing upward forces above some safety level to be exerted, the hinged tray forks will swing upwardly to prevent the full motive force of the conveyor from being brought to bear on the obstructions. The force safety level is determined according to one embodiment of the invention by the hinged forks being held in their normal load-supporting positions abutting the cross-bar by springs resisting displacement thereof relative to the end forks. Alternatively, the intermediate tray forks may be releasably held in their normal positions by weak shear pins which rupture in response to obstructing forces applied in excess of the safety level aforementioned.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein.

Figure 2:
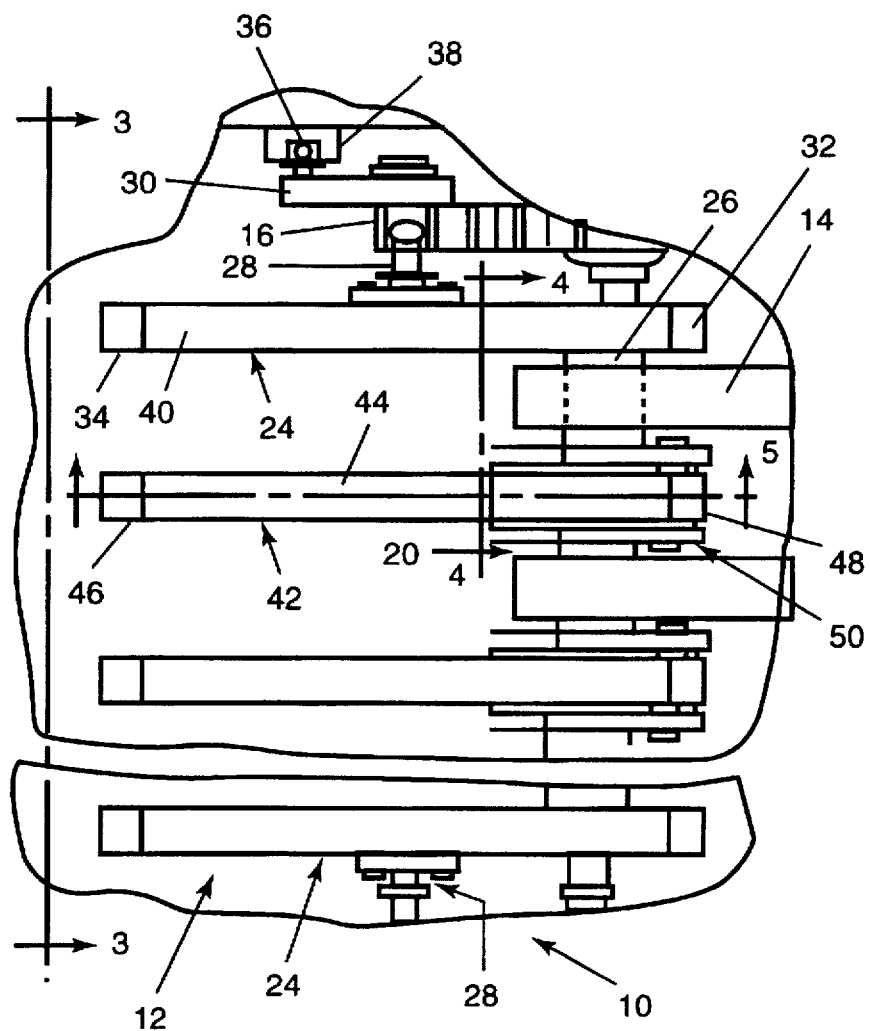
FIG. 2 is a partial top plan view of the conveyor tray as seen from section line 2—2 in FIG. 1.
Figure 4:
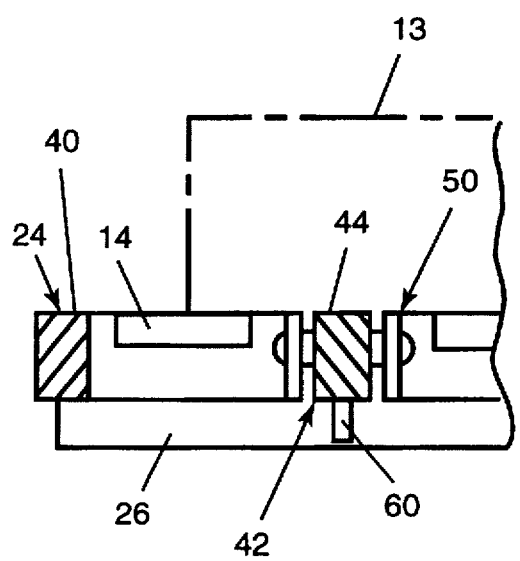
Figure 5:
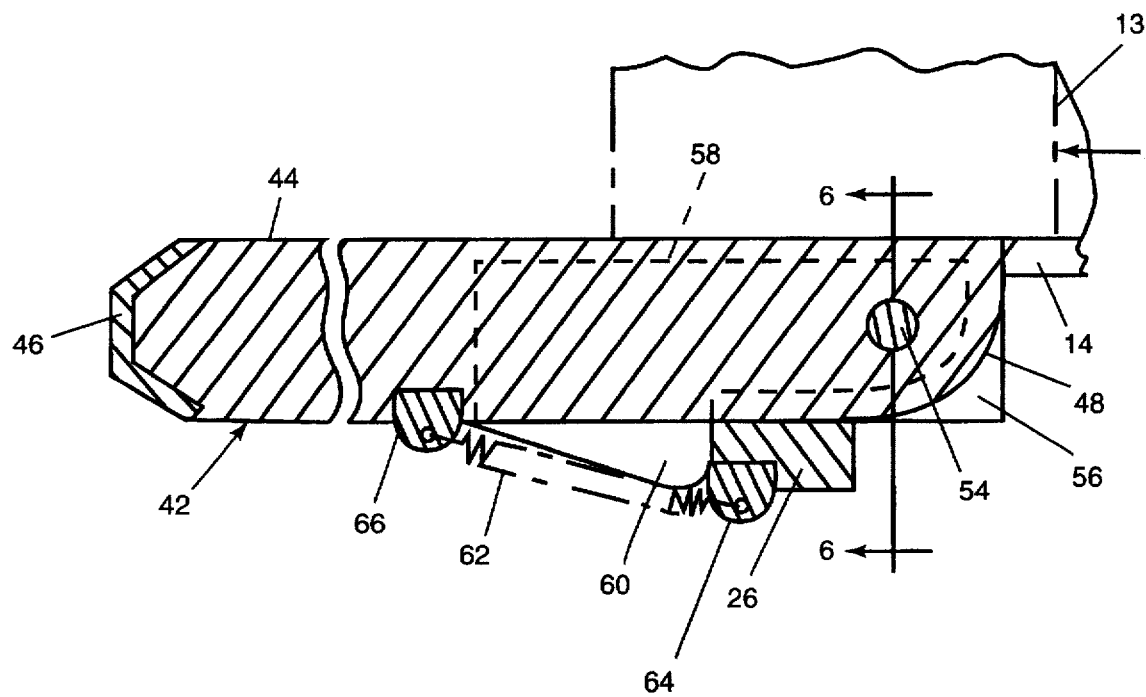
Figure 5A:
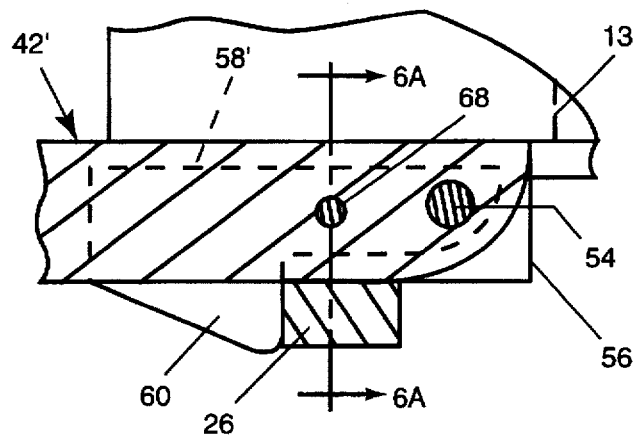
Figure 6:
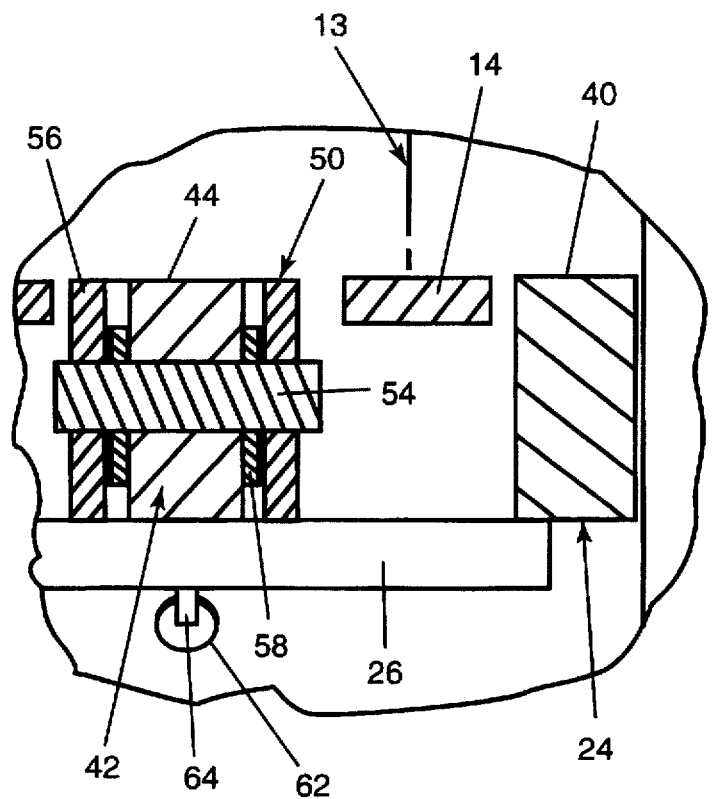
Figure 6A:
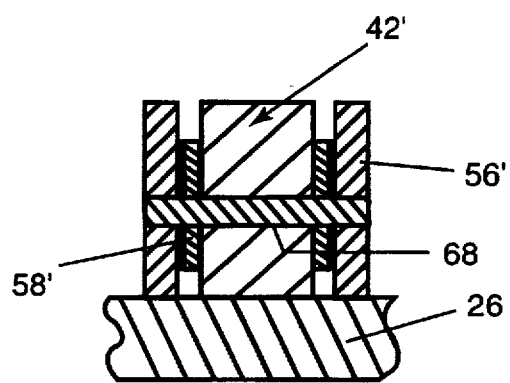
Figure 7:
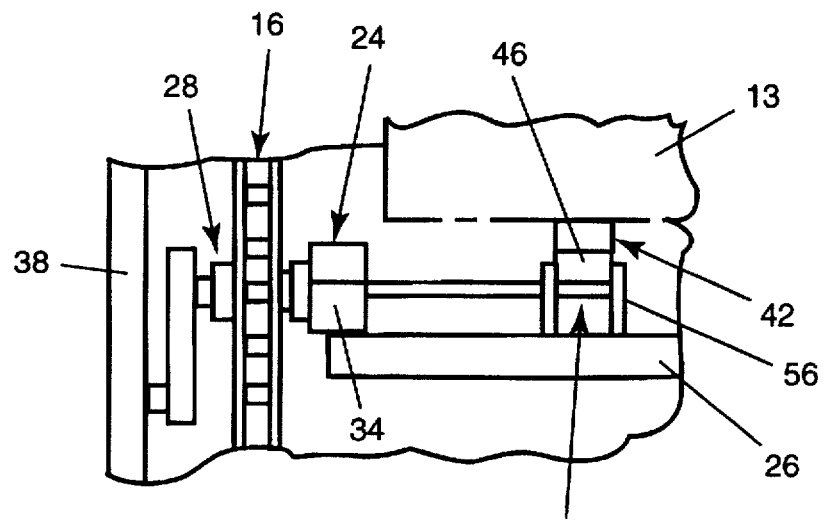
Figure 8:
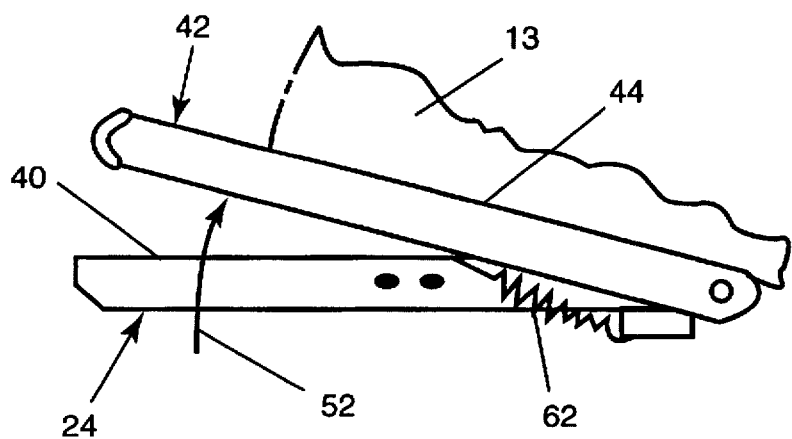

FIGS. 4 and 5 are partial section views taken substantially through planes indicated by section lines 4—4 and 5—5 in FIG. 2;

FIG. 6 is a partial section view taken substantially through a plane indicated by section line 6—6 in FIG. 5;

FIGS. 5A and 6A are partial section views corresponding to those of FIGS. 5 and 6, featuring modifications of the conveyor tray in accordance with another embodiment of the invention; and FIGS. 7 and 8 are respectively partial front and side plan views of the conveyor tray shown in FIGS. 1–6, undergoing displacement by resisting forces in excess of a safety level.

DETAILED DESCRIPTION OF PREFERRED EMBODIMENTS

Figure 1:
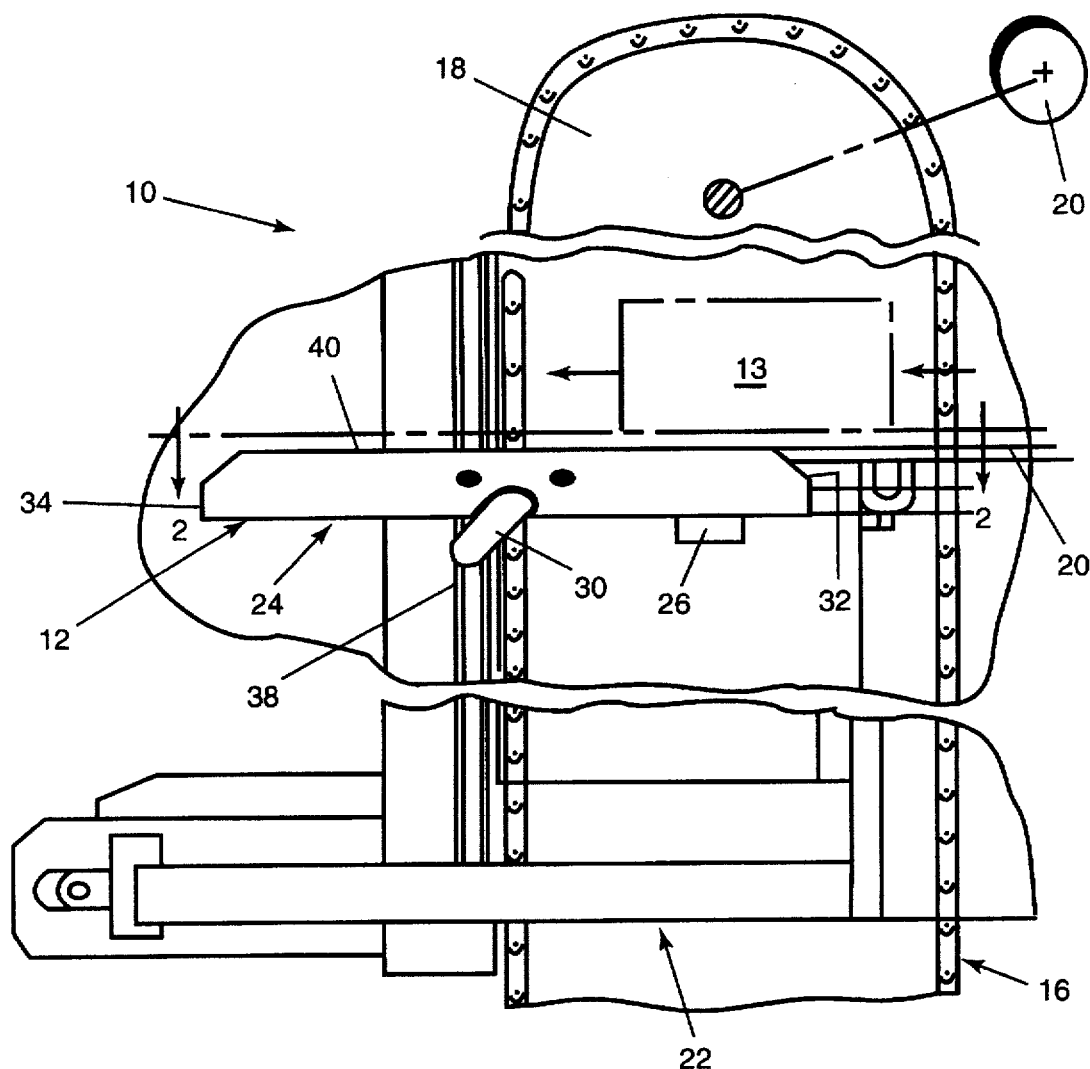
FIG. 1 is a partial side view showing portions of interest within a vertical package conveyor having a load carrying tray constructed in accordance with one embodiment of the present invention.

Referring now to the drawing in detail, FIGS. 1 and 2 illustrate certain portions of interest in a vertical package conveyor, generally referred to by reference numeral 10, embodying a generally horizontal carriage tray 12 onto which a package 13 (shown in dotted lines in FIG. 1) is loaded for vertical transport from some loading deck, formed for example by a plurality of elongated boards 14 which project into overlapping relationship with the tray 12 in its upper loading position as shown. The conveyor 10 is of a type having a pair of endless drive chains 16 enmeshed at the upper and lower ends with drive sprockets, including the upper drive sprocket 18 to which a drive motor 20 is connected as diagrammed in FIG. 1. Powered vertical travel is thereby imparted to the tray 12, to which the drive chains 16 are connected, for movement along a vertical conveyor path to some unloading platform 22 as also shown in FIG. 1.

The tray 12 is formed by a plurality of elongated forks including two end forks 24 of generally known construction. The end forks as shown in FIGS. 1 and 2 are fixedly interconnected with each other in lateral spaced relation by a cross-bar 26. The drive chains 16 are connected to such end forks 24 through cam follower assemblies 28 from which cam levers 30 extend intermediate opposite beveled ends 32 and 34 of the end forks. Cam rollers 36 at the lower ends of such cam levers 30 are retained within vertical guide tracks 38 so as to correctionally displace the end forks 24 during vertical travel in order to maintain them in horizontal load supporting orientation, despite any directional deviation from a vertical path. Except for the construction and arrangement of the tray 12 between the end forks 24, the conveyor arrangement associated with the tray 12, as hereinbefore described, is generally known in the art.

Figure 3:
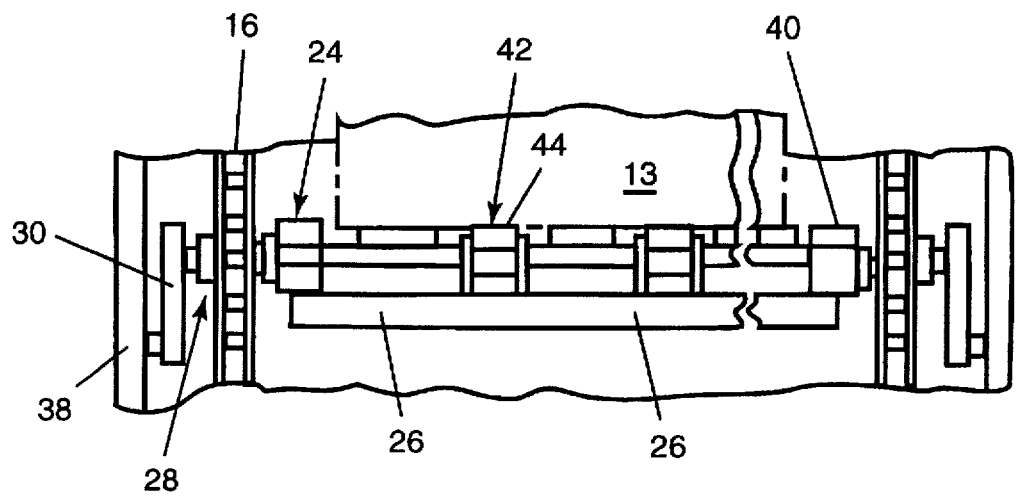
FIG. 3 is a partial front end view of the conveyor tray as seen from section line 3—3 in FIG. 2.

The end forks 24 have upper surfaces 40 which are aligned with a common plane by the interconnecting cross-bar 26, maintained in a generally horizontal orientation as aforementioned for load supporting purposes. In accordance with the present invention, a plurality of laterally spaced intermediate forks 42 are hingedly mounted on the cross-bar 26 in spaced relation to each other between the end forks 24 so as to present upper load supporting surfaces 44 as shown in FIGS. 2–6. With the intermediate forks positioned in abutment with the cross-bar 26 as shown in FIGS. 3, 4 and 6, the upper surfaces 44 thereof are aligned with surfaces 40 on the end forks 24 to define a common horizontal load supporting plane on which the package 13 is carried during powered travel of tray 12 along the vertical conveyor path. The intermediate forks 42 are not however rigidly connected to the cross-bar, as in the case of end forks 24, so that they may be displaced relative to the horizontal load supporting plane as hereinafter explained.

As shown in FIGS. 5 and 6, each of the intermediate forks 42 includes a reinforced forward end portion 46 from which the load supporting surface 44 extends rearwardly to the opposite end portion 48. A hinge assembly 50 pivotally mounts each intermediate fork 42 on the cross-bar 26 for upward pivotal displacement by some obstruction force 52, as shown in FIGS. 7 and 8. The load supporting surfaces 44 on the intermediate forks 42 are thereby angularly displaced out of alignment with the common plane of the end fork surfaces 40 to avoid rupture of the tray and resulting damage to the conveyor, to any load 13 being conveyed and/or injury to any operating or monitoring personnel.

According to the embodiment illustrated in FIGS. 5 and 6, each of the hinge assemblies 50 includes a pivot pin 54 extending through the intermediate fork 42 in spaced adjacency to its end portion 48. The pivot pin 54 is supported in spaced relation to the top of the cross-bar 26 by a pair of hinge plates 56 fixed as by welding to the cross-bar 26. Another pair of stop plates 58, having openings through which pivot pin 54 extends, are fixed to the sides of intermediate fork 42 from which the hinge plates 56 are spaced as more clearly seen in FIG. 6. Formation 60 of the plates 58 project downwardly from the fork 42 in abutment with the cross-bar 26 so as to limit downward displacement of the fork 42 to its normal load supporting position as shown. The fork 42 is yieldably held in such position by a spring 62 having opposite ends thereof respectively anchored to the cross-bar 26 and bottom of the fork 42 by tabs 64 and 66. Thus, the bias of spring 62 will determine the safety level of force 52, as diagrammed in FIG. 8, which will upwardly displace the fork 42 from its normal position. Such force level will for example be achieved if the tray 12 encounters a jamming obstruction as it approaches the lower unloading platform 22 of the conveyor shown in FIG. 1.

As an alternative to the use of springs 62 for yieldably or releasably holding the intermediate forks 42 in their normal positions abutting the cross-bar 26, modified forms of hinged intermediate forks 42' may be releasably held in their normal positions on the cross-bar 26 as illustrated in FIGS. 5A and 6A, without use of any springs. Each intermediate fork 42' in such embodiment has a relatively weak shear pin 68 extending therethrough and anchored to the cross-bar 26 through hinge plates 56' spaced from the sides of fork 42' by stop plates 58'. In response to some upward force exerted on the intermediate fork 42' in excess of a safety level, the shear pin 68 will rupture so as to accommodate upward displacement of the fork 42' from its normal position established by abutment of the position limiting formation 60 of the stop plates 58' with the cross-bar, as shown in FIG. 5A.

Obviously, other modifications and variations of the present invention may be possible in light of the foregoing teachings. It is therefore to be understood that within the scope of the appended claims the invention may be practiced otherwise than as specifically described.

What is claimed is:

1. A combination of a conveyor having a carriage tray and powered means connected to said tray for displacement thereof along a conveyor path, said tray including a plurality of forks having load supporting surfaces thereon, a cross-bar interconnecting two of said forks in spaced relation to each other with the load supporting surfaces thereon aligned in a common plane, and a safety arrangement including hinge means mounting the other of the forks on the cross-bar between the two forks for displacement relative thereto; and means releasably holding said other of the forks in positions on the cross-bar with the load supporting surfaces thereon aligned with said common plane.

2. The combination as defined in claim 1 including means connected to said two of the forks for maintaining the common plane substantially horizontal during said displacement of the tray along the conveyor path.

3. The combination as defined in claim 2 wherein the releasable holding means comprises a spring-loaded device operatively interconnected between the cross-bar and each of the other of the forks to yieldably resist relative displacement of said other of the forks from said positions aligned with said common plane.

4. The combination as defined in claim 1 wherein the releasable holding means comprises a spring-loaded device operatively interconnected between the cross-bar and each of the other of the forks to yieldably resist relative displacement of said other of the forks from said positions aligned with said common plane.

5. In combination with a conveyor having a tray formed by a plurality of forks and drive means connected to two of said forks for powered travel of the tray along a conveyor path, the improvement residing in: a cross-bar fixedly interconnecting said two of the forks in spaced relation to each other; means mounting the other of the forks on the cross-bar between said two of the forks for displacement relative to the cross-bar; and means releasably holding the other of the forks in positions on the cross-bar aligned with said two of the forks for establishing a load supporting surface plane.

6. The improvement as defined in claim 5 wherein said releasable holding means comprises spring means biasing the other of the forks to said positions on the cross-bar for resisting said displacement thereof relative to the cross-bar by forces below a predetermined safety level.

7. In combination with a conveyor including a tray formed by a plurality of forks having load supporting surfaces thereon and drive means connected to two of the forks for powered movement of the tray along a conveyor path, the improvement residing in: means fixedly interconnecting said two of the forks in spaced relation to each other for maintaining the load supporting surfaces thereon in alignment with a common plane; and means releasably mounting the other of the forks on said interconnecting means for displacement from operative positions in which the load supporting surfaces thereon are in alignment with said common plane.

8. In combination with a conveyor including a tray formed by a plurality of forks having load supporting surfaces thereon and drive means connected to two of the forks for powered movement of the tray along a conveyor path, the improvement residing in: means fixedly interconnecting said two of the forks in spaced relation to each other for maintaining the load supporting surfaces thereon in alignment with a common plane: and mounting means for releasably holding the other of the forks in operative positions with the load supporting surfaces thereon in alignment with said common plane, said mounting means comprising a cross-bar through which said two of the forks are fixedly interconnected; hinge means connected to the cross-bar for pivotal support of the other of the forks thereon, and means biasing the other of the forks toward abutment with the cross-bar for resisting displacement of the other of the forks from said operative positions by forces below a predetermined safety level.

9. In combination with a conveyor including a tray formed by a plurality of forks having load supporting surfaces thereon and drive means connected to two of the forks for powered movement of the tray along a conveyor path, the improvement residing in: means fixedly interconnecting said two of the forks in spaced relation to each other for maintaining the load supporting surfaces thereon in alignment with a common plane; means mounting the other of the forks in operative positions with the load supporting surfaces thereof in alignment with said common plane; and means releasably holding the other of the forks in said operative positions for displacement therefrom by forces in excess of a predetermined safety level.

* * * * *